July 9, 1935.  F. A. GAUGER  2,007,714
FLUID HEATER
Filed March 27, 1933
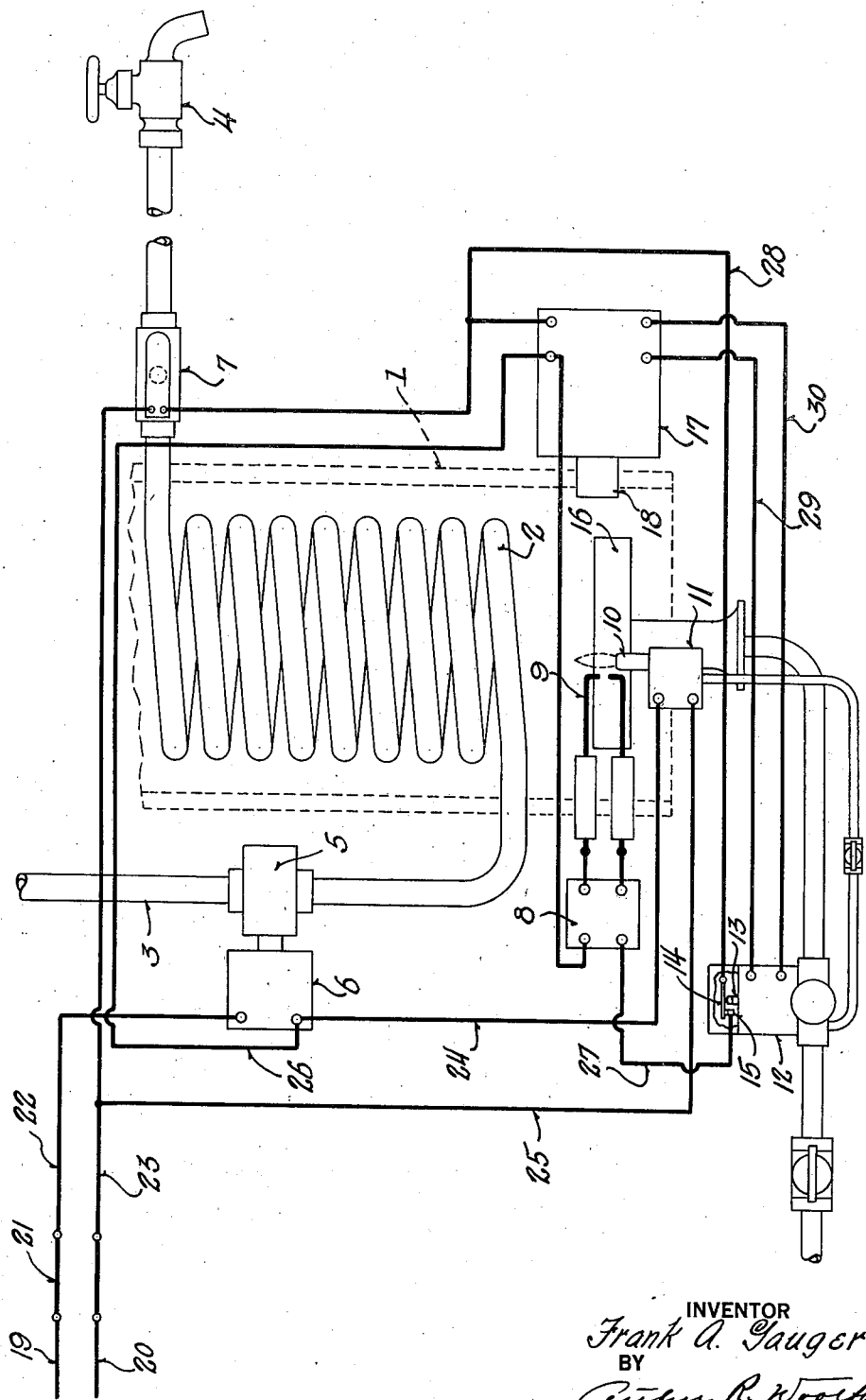
INVENTOR
Frank A. Gauger
BY
Arthur R. Woofolk
ATTORNEY Patented July 9, 1935

2,007,714

UNITED STATES PATENT OFFICE 2,007,714

FLUID HEATER

Frank A. Gauger, Milwaukee, Wis.

Application March 27, 1933, Serial No. 662,894

5 Claims. (Cl. 236—21)

This invention relates to fluid heaters.

In instantaneous water heaters, for instance, as heretofore constructed, it has been the practice to provide either a storage tank which was thermally insulated and which was maintained full of hot water, or else to provide a relatively large heater with a constantly burning pilot light so that the main burner was lighted from the constantly burning pilot light. Also in the storage type heater there was always a constantly burning pilot light employed.

It has been found that a considerable expense is involved in keeping the pilot light going at all times on the one hand, and that also a material expense is involved due to the loss of heat through the jacket of the storage tank.

This invention overcomes the defects noted above, and objects of this invention are to provide an instantaneous water heater in which neither a storage tank is employed nor a constantly burning pilot light, but instead in which a pilot light is automatically lighted whenever a demand is made for hot water, and in which the water is instantly heated to the desired temperature, and in which both the burner and the pilot light are cut off after the demand for hot water has ceased, and to provide such a construction in which their function is automatically controlled without any thought on the part of the operator.

Further objects are to provide an instantaneous water heater in which a pilot light is automatically lighted, in which a main burner is subsequently automatically turned on, but only after the pilot light has been lighted and is actually burning, so that there is no chance of an explosion occurring due to a sudden large discharge of a combustible mixture followed by an attempt to ignite it, but instead in which a pilot light is first lighted to insure absolute safety, and thereafter means controlled by the pilot light instantly turns on the main burner.

Further objects are to provide an instantaneous water heater in which the amount of fuel consumed is directly controlled by the amount of hot water demanded, in which the temperature of the delivered hot water is automatically controlled and held at a predetermined value so that irrespective of the rate of flow, that is to say, whether a large flow of water is demanded or a small flow is demanded, the temperature of the delivered water is automatically maintained at a certain predetermined value, which, of course, may be adjusted or set at any desired temperature, and in which the amount of fuel consumed is directly proportioned automatically to the amount of hot water delivered.

Further objects are to provide a construction in which the pilot light is automatically cut off and turned on, in which automatic means are provided for igniting the pilot light, such automatic means being subsequently cut off when the pilot light is lighted, in which instantly responsive means, such, for example, as a photo-electric unit, is employed and is directly controlled by the pilot light for controlling the main burner so that the main burner cannot be turned on until the pilot light is actually burning, in which means are provided for automatically cutting off the main burner when the temperature of the delivered water arrives at a predetermined value, in which the main burner is again automatically turned on whenever the temperature of the delivered water falls below a certain predetermined value, and in which the pilot light is finally automatically cut off after the demand for the hot water has ceased, so that there is no expense incurred due to maintaining a volume of water hot on the one hand, or due to maintaining a constantly burning pilot light on the other.

An embodiment of the invention is shown in the accompanying drawing, in which:—

The single figure is a diagrammatic view of the instantaneous water heater.

Referring to the drawing, it will be seen that the instantaneous water heater comprises a casing 1 within which is located the heating coil 2. The heating coil is supplied from the cold water main 3 and leads to any source of delivery such, for instance, as the spigot 4. Of course, any number of spigots may be employed as desired.

A differential pressure valve indicated by the reference character 5 is placed in the inlet pipe 3 and controls an electric switch indicated generally by the reference character 6. A thermostat 7 is placed in the outlet pipe from the heater and responds to the temperature of the delivered water, such thermostat opening an electric switch hereinafter described when the temperature arrives at a predetermined point, and again closing the circuit whenever the temperature falls below this point.

An ignition transformer is provided and indicated at 8. It supplies the spark plug electrodes 9 with a high voltage alternating current for igniting the pilot light under predetermined conditions hereinafter described. The pilot light is indicated by the reference character 10 and is controlled by the electromagnetic pilot light valve shown generally at 11. An electromagnetic main valve is indicated by the reference character 12. This device may be provided with a movable plunger 13 which opens a small switch whose movable arm is indicated at 14, the stationary contact being indicated by the reference character 15. The main burner is indicated by the reference character 16.

A photo-electric unit is indicated generally by the reference character 17. This may take any of the usual forms, such as is commercially supplied, and can be purchased on the open market. The unit may comprise a photo-electric cell, a vacuum tube amplifier, and a relay. None of these parts, however, are shown as any photo-electric unit capable of handling sufficient current for controlling the main electromagnetic valve 12 can be employed and as these units are well known and are commercial products.

The photo-electric unit has a sleeve 18 which projects through the casing 1 and focuses or centers on the flame of the pilot light 10 so that when the pilot light is burning, the photo-electric cell is energized and current is supplied the main electromagnetic valve 12 in a manner hereinafter described. When the pilot light is not burning, obviously the photo-electric unit does not operate and the main burner cannot operate.

The electric supply mains are indicated by the reference characters 19 and 20 and are connected by means of a main switch, indicated generally at 21, with the conductors 22 and 23. The conductor 22 leads to one terminal of the differential pressure switch 6 through the switch by way of the conductor 24, through the electromagnetic pilot valve 11, and back by conductor 25 to the conductor 23. Further, the switch 6 is connected by means of the conductor 26 to the photo-electric unit 17 and also to the primary of the ignition transformer 8. The other side of the ignition transformer primary is connected by means of conductor 27 through the stationary contact 15 and movable contact 14, to the conductor 28. This conductor leads to the thermostat 7 and from there leads to the conductor 23. Also, conductor 28 is connected to the photo-electric unit 17. The photo-electric unit controls the main burner 12, being connected thereto by means of conductors 29 and 30.

It is to be distinctly understood at this point that the amplifying vacuum tube of the photo-electric unit may be energized from any portion of the electric system desired, so that the delay in heating the vacuum tube cathode does not hinder the instantaneous operation of the apparatus.

It is not thought necessary to detail the circuits of this unit other than to state that the photo-electric unit controls the main valve 12, the ignition transformer being controlled by the switch 14, 15 operated from the main valve and also by the thermostat 7 in the operation of the apparatus, the ignition apparatus being initially maintained open as the differential pressure switch 6 is maintained open when the apparatus is not in operation.

The operation of the apparatus is as follows:

Assuming that the spigot 4 is closed, it is obvious that the differential pressure switch 6 is opened and consequently all electrical circuits are open. As soon as the spigot 4 is opened, the differential pressure switch 6 closes and the ignition apparatus 8 functions and a spark passes between the spark electrodes or spark plug 9. Further, the electromagnetic pilot valve 11 opens and gas is consequently turned on and the pilot light lighted. The photo-electric unit, which is controlled from the pilot light flame, instantly energizes the main electromagnetic valve 12 and the main burner 16 is turned on and lighted from the pilot light. However, as soon as the main valve opens, the movable contact 14 moves away from the stationary contact 15 and the ignition apparatus is cut off. The burner heats the coil 2 and hot water immediately flows from the spigot 4. If only a very small quantity of water is called for by a partial opening of the spigot, it is obvious that the thermostat 7 will operate to open the circuit which supplies the photo-electric unit, and consequently to cause the main valve to close.

However, as soon as the temperature of the delivered water falls a predetermined amount, the thermostat 7 closes, and consequently the main valve is again supplied with electrical energy through the photo-electric unit 17 and consequently the main burner is again turned on, thus again supplying heat to the coil 2. The main burner may go on and off several times during the delivery of water if the volume of water delivered is not very great, but nevertheless, the time interval required for the heat to be transmitted through the coil 2 to the water smooths out these pulsations so that for all practical purposes a uniform temperature of delivered water is maintained, irrespective of the rate of flow of the water.

It is obvious that if a large rate of flow of water is demanded, that the burner will be on for a greater length of time and off for shorter intervals. Thus the amount of fuel consumed is directly proportioned to the volume of heated water delivered.

It is to be noted particularly that the switch 14, 15, and the thermostat 7 are in series with the primary of the ignition transformer 8 so that the electric ignition apparatus for the normally dormant pilot burner does not continue to operate after the normally dormant pilot burner has been lighted. When the requisite quantity of water has been drawn, the spigot is closed and the pressure switch 6 opens, thereby opening all electric circuits and thereby closing the pilot valve and the main valve.

There is no waste due to the storing of heated water on the one hand, nor is there any waste due to a constantly burning pilot light on the other. Nevertheless, the response is instantaneous whenever there is a demand for hot water.

It is clear that this device may be left installed for an indefinite period and unless used, there is no expense incident thereto. However, the expense of operation is always directly proportioned to the amount of hot water actually drawn.

It will be seen that a novel form of instantaneous water heater has been provided, in which an automatic pilot is turned on and off in a wholly automatic manner as the spigot or other outlet device is opened or closed, in which the instantaneous heater main burner is controlled by the pilot light itself and cannot be turned on unless the pilot light is burning, and it is to be noted particularly that there is no time delay in the turning on of the main burner after the pilot light has been automatically lighted, as means are provided, such as the photo-electric unit, for instant response to the pilot light.

It will be seen further that although the instantaneous water heater provided by this invention fulfills all of the functions noted above, that nevertheless it is wholly safe in its operation and there is no chance of an explosion occurring, although no thought whatsoever is required of the operator.

It is to be distinctly understood that although a heating coil has been shown for the water, that nevertheless any suitable heat exchange means through which the water may flow may be employed without departing from the spirit of this invention.

Further, it is to be understood that although the invention has been described as directed to an instantaneous water heater, that obviously any other liquid could be heated where required, and that, therefore, the expression "water" is to be interpreted as covering any liquid.

Although this invention has been described in considerable detail, it is to be understood that such description is intended as illustrative rather than limiting, as the invention may be variously embodied and is to be interpreted as claimed.

I claim:

1. A fluid heater comprising heat exchange means through which the fluid is adapted to pass, a main burner for heating said means, a main valve for said main burner, a normally dormant pilot burner for said main burner, means responsive to the flow of fluid through said heat exchange means, a thermostat responsive to the temperature of the fluid from said heat exchange means and having open circuit and closed circuit positions, means responsive to said normally dormant pilot burner, said pilot burner being controlled by the fluid flow responsive means, said main valve being controlled jointly by the fluid flow responsive means and the pilot burner responsive means and said thermostat, and ignition means, said ignition means being cut off when said thermostat occupies open circuit position.

2. A fluid heater comprising heat exchange means through which the fluid is adapted to pass, a main burner for heating said means, a main valve for said main burner, a normally dormant pilot burner for said main burner, means responsive to the flow of fluid through said heat exchange means, a thermostat responsive to the temperature of the fluid from said heat exchange means and having open circuit and closed circuit positions, means responsive to said normally dormant pilot burner, said pilot burner being controlled by the fluid flow responsive means, said main valve being controlled jointly by the fluid flow responsive means and the pilot burner responsive means and said thermostat, and ignition means, said ignition means being cut off when said thermostat occupies open circuit position.

3. A fluid heater comprising heat exchange means through which the fluid is adapted to pass, a main burner for heating said means, a main valve for said main burner, a normally dormant pilot burner for said main burner, means responsive to the flow of fluid through said heat exchange means, a thermostat responsive to the temperature of the fluid from said heat exchange means and having open circuit and closed circuit positions, means responsive to said normally dormant pilot burner, said pilot burner being controlled by the fluid flow responsive means, said main valve being controlled jointly by the fluid flow responsive means and the pilot burner responsive means and said thermostat, and ignition means, said ignition means being cut off when said thermostat occupies open circuit position, said fluid heater having no burning flame when fluid is not passing through said heater.

4. An instantaneous water heater comprising heat exchange means through which fluid is adapted to pass, a main burner for heating said means, a main valve for said main burner, a differential pressure means responsive to fluid flow through said heat exchange means, a normally dormant pilot burner, an auxiliary valve for said normally dormant pilot burner, said auxiliary valve, being controlled from said differential pressure means, a photo-electric means controlled by said pilot light for controlling said main valve, and electric ignition means controlled from said main valve and from said differential pressure means.

5. An instantaneous water heater comprising heat exchange means through which fluid is adapted to pass, a main burner for heating said means, a main valve for said main burner, a differential pressure means responsive to fluid flow through said heat exchange means, a normally dormant pilot burner, an auxiliary valve for said normally dormant pilot burner, said auxiliary valve being controlled from said differential pressure means, a photo-electric means controlled by said pilot light for controlling said main valve, and electric ignition means controlled from said main valve and from said differential pressure means, said ignition means being inactive when said main valve is open.

FRANK A. GAUGER.